J. LICHTENBERGER.

MAP-EXHIBITOR.

No. 6,841. Reissued Jan. 4, 1876.

*WITNESSES*

Wm. L. Coombs

T. M. Coombs

*By*

*INVENTOR*

John Lichtenberger,

By S. S. Coombs,

*Attorney.*

N. PETERS, PHOTO-LITHOGRAPHER, WASHINGTON, D. C.

UNITED STATES PATENT OFFICE.

JOHN LICHTENBERGER, OF FORT WAYNE, INDIANA, ASSIGNOR OF ONE-HALF INTEREST TO ROBERTSON J. FISHER.

IMPROVEMENT IN MAP-EXHIBITORS.

Specification forming part of Letters Patent No. 159,335, dated February 2, 1875; reissue No. 6,841, dated January 4, 1876; application filed December 1, 1875.

*To all whom it may concern:*

Figure 1:
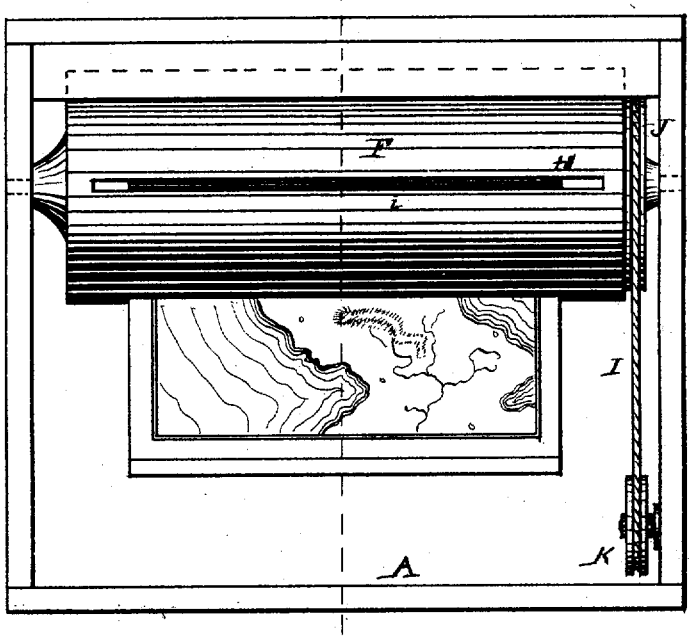
Figure 2:
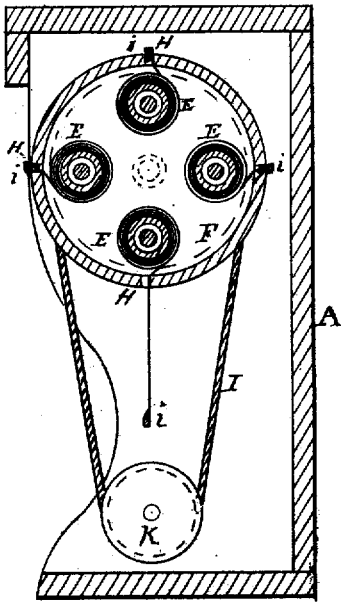

Be it known that I, JOHN LICHTENBERGER, of Fort Wayne, in the county of Allen and State of Indiana, have invented a new and Improved Map-Rack, of which the following is a specification:

In the accompanying drawing, Figure 1 represents a front elevation of a map-rack constructed in accordance with my invention; and Fig. 2 represents a transverse section of the same on line *x x*, Fig. 1.

The same letters indicate the same parts in both figures.

A represents a bracket or frame for hanging on the wall to support the map-rollers. F is a hollow rotating cylinder or box, having its journal-bearings in the sides of the bracket A. Around the shaft of this cylinder are arranged the map-rollers E, having their journal-bearings in the cylinder-heads. Opposite each map-roller there is an open slot, H, in the cylinder or box F, for the map to drop through.

To rotate this cylinder or box a drive-pulley, J, may be placed upon one end of its shaft, having a cord, I, passing around it, and around an idle-pulley, K; but I do not deem these devices for rotating the cylinder essential, as it may be easily rotated without them.

The hollow box F may be cylindrical or polygonal in form, or a revolving open frame may be employed.

Any approved kind of spring-rollers may be used for holding the maps. The strips *i* at the lower ends of the maps prevent them from being drawn within the cylinder through the slots H, as shown in the drawings.

Having thus fully described my invention, what I claim as new, and desire to secure by Letters Patent, is—

1. The combination of the bracket or frame A with the hollow slotted cylinder or box F, provided with a series of map-rollers, E, arranged within it and about its shaft, substantially as set forth.

2. The combination of the bracket or frame A, the slotted cylinder or box F, carrying within it the map-rollers E, the drive-pulley J, belt I, and idler K, arranged to operate substantially as described.

JOHN LICHTENBERGER.

Witnesses:

D. C. FISHER,

S. L. HOUGH.